(12) United States Patent
Caliskan et al.

(10) Patent No.: US 8,087,719 B2
(45) Date of Patent: Jan. 3, 2012

(54) SANDWICH PANEL

(75) Inventors: Ari Garo Caliskan, Canton, MI (US);
John Edward Huber, Novi, MI (US)

(73) Assignee: Ford Global Technologies, Dearborn, MI (US)

( * ) Notice: Subject to any disclaimer, the term of this patent is extended or adjusted under 35 U.S.C. 154(b) by 9 days.

(21) Appl. No.: 12/784,481

(22) Filed: May 20, 2010

(65) Prior Publication Data

US 2011/0285171 A1 Nov. 24, 2011

(51) Int. Cl.
*B60J 7/00* (2006.01)
(52) U.S. Cl. .................. 296/191; 296/210; 29/897.2
(58) Field of Classification Search .............. 296/191, 296/210, 193.11, 211, 187.02, 187.04, 190.08, 296/146.5, 146.6, 76; 29/897.2
See application file for complete search history.

(56) References Cited

U.S. PATENT DOCUMENTS

| | | | |
|---|---|---|---|
| 3,909,995 A | 10/1975 | Bainter et al. | |
| 4,740,346 A | 4/1988 | Freeman | |
| 5,928,772 A | 7/1999 | Shiraishi | |
| 5,992,117 A * | 11/1999 | Schmidt | 52/582.1 |
| 5,994,666 A | 11/1999 | Buldhaupt et al. | |
| 6,207,244 B1 * | 3/2001 | Hesch | 428/35.9 |
| 6,419,146 B1 | 7/2002 | Buldhaupt et al. | |
| 6,508,394 B1 | 1/2003 | Buldhaupt et al. | |
| 6,712,418 B1 * | 3/2004 | Lathers | 296/100.02 |
| 6,848,739 B2 * | 2/2005 | Stallfort et al. | 296/215 |
| 7,100,259 B2 | 9/2006 | Morales | |
| 7,300,894 B2 | 11/2007 | Goodell | |
| 7,735,908 B2 * | 6/2010 | Wang et al. | 296/193.11 |
| 2007/0275177 A1 | 11/2007 | Mack et al. | |
| 2010/0021686 A1 | 1/2010 | Groussard | |

FOREIGN PATENT DOCUMENTS

| | | |
|---|---|---|
| GB | 1187478 | 4/1970 |
| SE | 200400567 A | 9/2005 |

OTHER PUBLICATIONS http://www.diabgroup.com/aao/a_ literature/a_ pdf_ files/bul_pdf/finishing.pdf.

* cited by examiner

*Primary Examiner* — Joseph Pape
(74) *Attorney, Agent, or Firm* — Gigette M. Bejin; Fredrick Owens

(57) ABSTRACT

A sandwich panel for a vehicle is provided. The sandwich panel includes a first panel defining a plurality of apertures, and a second panel attached to the first panel. The second panel and the first panel define a cavity between the first panel and the second panel. Foam is disposed between the first panel and the second panel. The plurality of apertures of the first panel are operatively configured to receive a tool for pumping expandable foam in between the first panel and the second panel.

18 Claims, 3 Drawing Sheets

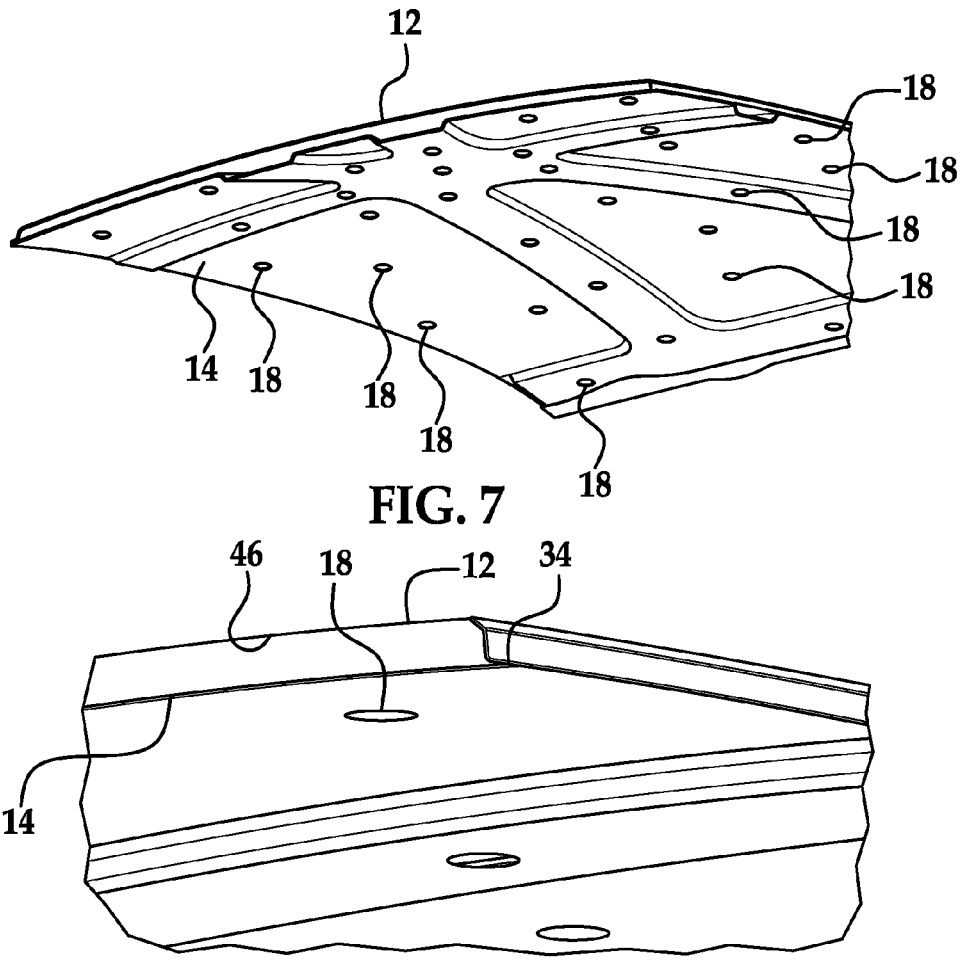
FIG. 7
FIG. 8
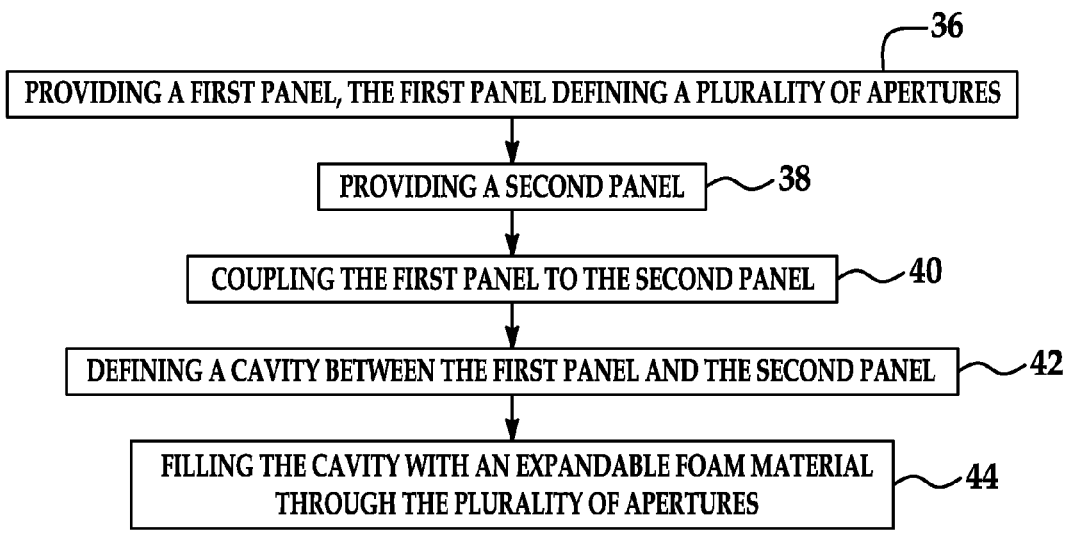
FIG. 9

SANDWICH PANEL

BACKGROUND

The present disclosure relates to a sandwich panel for an automotive vehicle.

The goal of the body-in-white development is to increase vehicle stiffness and crashworthiness while decreasing weight in order to improve fuel efficiency. The traditional method of addressing such issues is to use higher grade steels in structural components such as, but not limited to, rails, rockers, roof rails, etc. In certain applications, the use of hydroformed components or tubes in addition to adhesives and/or structural inserts have also aided in reducing weight while increasing vehicle stiffness and crashworthiness.

Closed section structural components are generally emphasized as providing such stiffness to weight characteristics. However, it may not always be possible to implement closed section structural components throughout a vehicle due to the difficulty of joining closed section components, among other reasons.

With respect to sandwich panels, sandwich panels have been used in vehicle floors and package trays for sedans to reduce road noise and vibration. Sandwich panels are traditionally made by stamping and molding the face sheets, molding the core into the shape of the sandwich, and then assembling the components together. However, the traditional method of building sandwich panels is costly and the cycle time is too long for mass production.

SUMMARY

A sandwich panel for a vehicle is provided according to the embodiments disclosed herein. The sandwich panel includes a first panel defining a plurality of apertures, and a second panel attached to the first panel. The second panel and the first panel define a cavity between the first panel and the second panel. Foam is disposed between the first panel and the second panel. The plurality of apertures of the first panel are operatively configured to receive a tool for pumping expandable foam in between the first panel and the second panel.

BRIEF DESCRIPTION OF THE DRAWINGS

FIG. 7 is an isometric view of a sandwich panel of the present disclosure wherein the sandwich panel is the vehicle roof.

FIG. 8 is an enlarged partial view of an edge of the sandwich panel of FIG. 7.

FIG. 9 is a flow chart of a method of the present disclosure.

DETAILED DESCRIPTION

Figure 1:
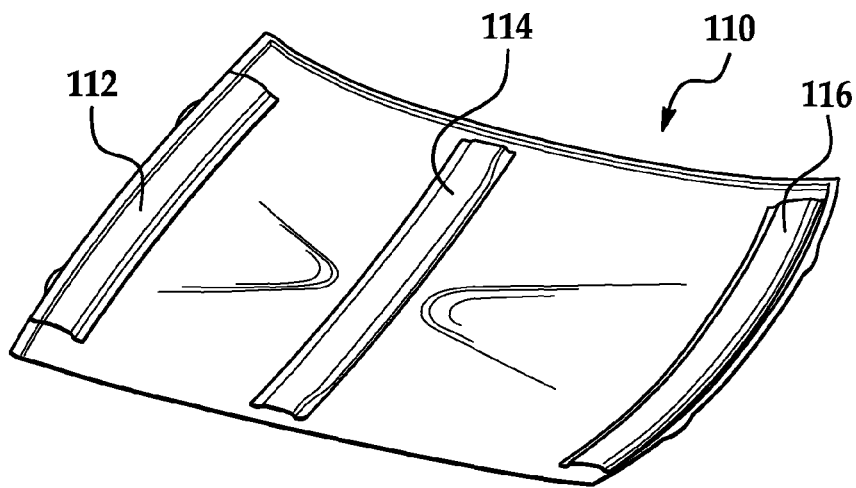
FIG. 1 is a perspective view showing the entire vehicle with frontal collision energy absorbing structure according to the embodiment of the present disclosure.
Figure 2:
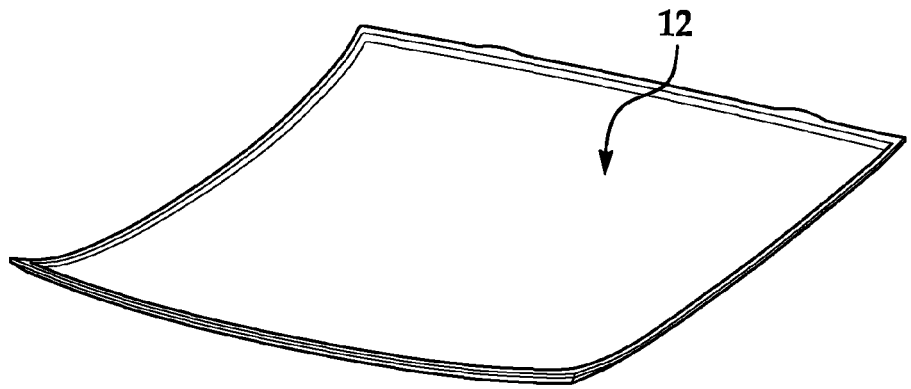
FIG. 2 is an isometric view of a body panel before it is stamped or molded.
Figure 3:
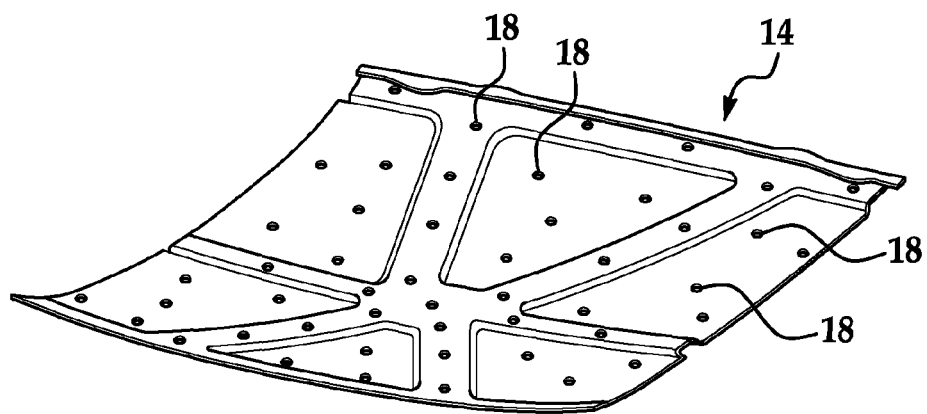
FIG. 3 is an isometric view of a body panel after it is stamped or molded.
Figure 4:
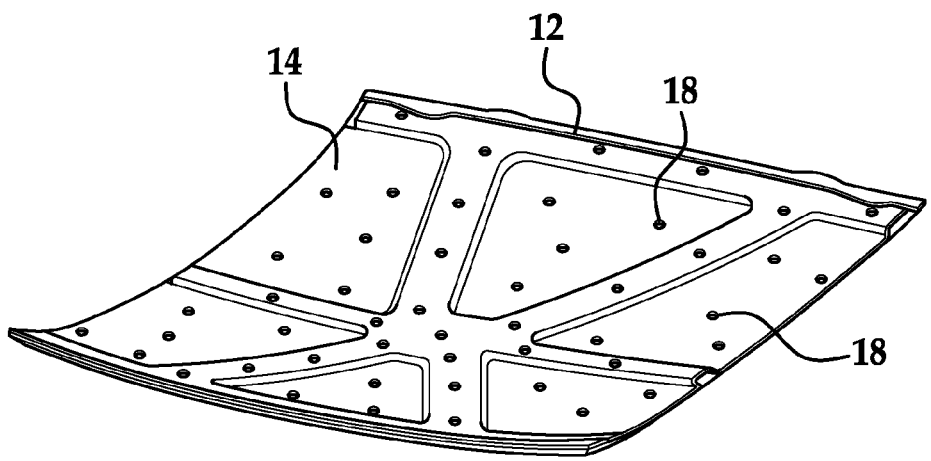
FIG. 4 is an isometric view of a body panel when the first and outer face sheets are joined together.

The present disclosure provides a structure which can provide high stiffness while reducing weight. The sandwich panel of the present disclosure may also minimize intrusion of the vehicle cabin area as much as possible.

Referring now to FIGS. 2-5, sandwich panel 10 of the present disclosure may be made using sheet metal in one non-limiting example. The components of the sandwich panel 10 of the present disclosure may include a first panel 14 and a second panel 12. The first and second panels 14, 12 may be formed from a structural material, such as but not limited to, steel. The first and second panels 14, 12 may each have a thickness of approximately 1 mm. However, the first and second panels 14, 12 may also have differing thicknesses and may be formed from different materials.

The first and second panels 14, 12 may be joined together using spot welding, riveting, or the like. Either the first or second panels 14, 12 (or both first and second panels 14, 12) may have apertures 18 formed therein. The apertures 18 are operatively configured to receive nozzles 16 or the like such that pumpable foam 24 may be injected in between the first and second panels 14, 12 from the nozzles 16.

As indicated, the first and second panels 14, 12 are joined together through either a mechanical interlock or via welding or the like. After joining the first and second panels, 14, 12 those components are placed in a fixture. The fixture 20, 22 may contain a plurality of nozzles 16 that may deliver a two part pumpable mixture wherein the two part pumpable mixture may expand and create a rigid foam 24 to fill the section between the first and second panels 14, 12. A non-limiting example of the two-part pumpable mixture may be DOW's Betafoam PU material. This example material has been used for filling cavities in Body-In-White structures to reduce noise and vibration in a vehicle while the vehicle is in use. Accordingly, the foam 24 material would have a low density relative to structural foams that may be used in joints to increase strength and stiffness.

One of the panels 14, 12, preferably the side that does not have external exposure would contain punched or molded-in apertures 18 in predetermined locations. As indicated, the entire assembly 10 would be placed in a fixture 20, 22 such that two-part pumpable foam 24 may be injected between the first panel 14 and the second panel 12.

Figure 5:
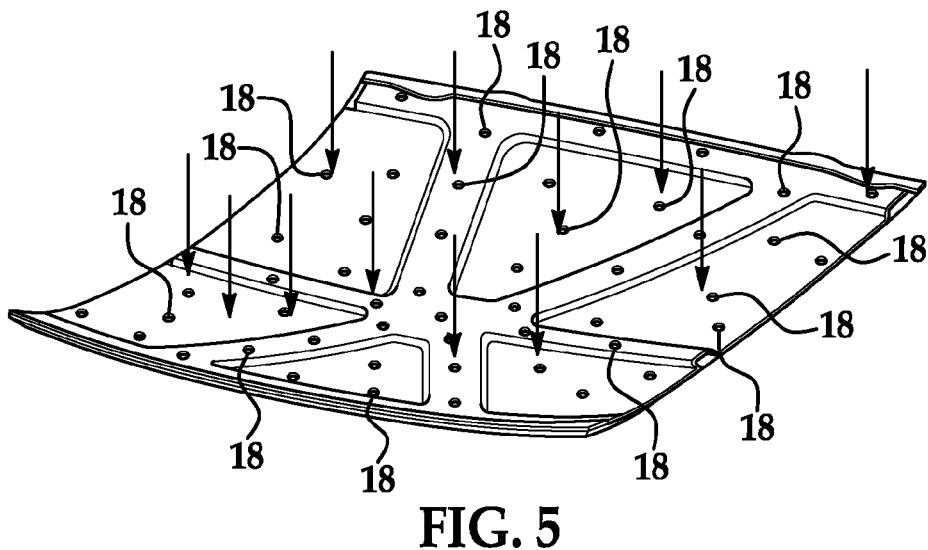
FIG. 5 is an isometric view of the joined body panels having the apertures for receiving two-part injected pumpable foam.
Figure 6:
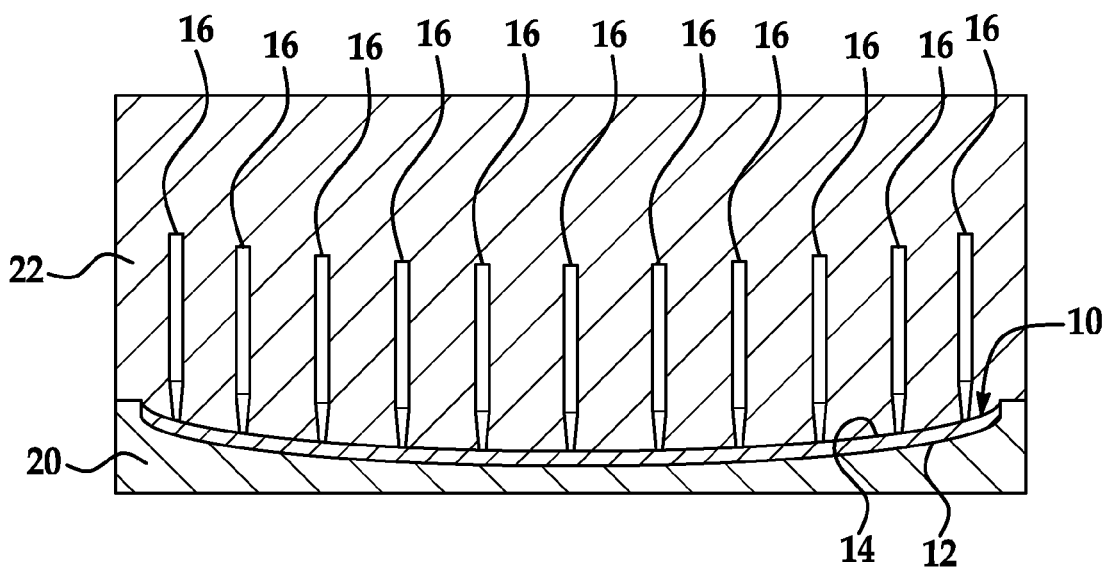
FIG. 6 is a cross sectional schematic view along lines A-A in FIG. 5 showing the proposed tool injecting the polyurethane foam into the body panels.

Referring now to FIG. 5, a schematic of the final step is shown. A soft tool (not shown) may be provided. The soft tool may consist of an upper half 22 and a lower half 20 that are the shape of the first panel 14 and the second panel 12 respectively. The soft tool may ensure that the first and second panels 14, 12 stay in place. The soft tool also ensures that the sheet metal panels 14, 12 do not lose their shape during foam 24 filling. The upper half 22 would contain PUR foam nozzles 16, which would line up with the holes or apertures 18 which are defined in the one of the first or second panels 14, 12. Some of the holes or apertures 18 defined in the first panel 14 would not have nozzles 16 inserted within the hole or aperture 18 in order to allow for air to escape from the cavity 46 as the foam 24 is injected into the cavity 46 through other apertures 18. Once the foam 24 is injected into the cavity, the foam 24 begins to expand and the part would be removed from the mold. As the foam 24 fully cures, some extra expansion of the foam 24 may occur such that foam 24 expands out of some of the apertures 18. The extra foam 24 may then be manually or robotically trimmed to provide a flush inner surface.

In an embodiment where the sandwich panel 10 constitutes a roof structure 26, the sandwich panel 10 may be designed such that the roof structure 26 incorporates the second panel 12 in addition the front and rear header 112, 116 (shown in FIG. 1) as well as the roof bows 114 (shown in FIG. 1). By incorporating these components into the sandwich panel 10, the overall vehicle weight may be reduced and the stiffness to weight ratio of the overall structure would improve.

Referring now to FIG. 1, a typical Body-In-White roof structure 110 is shown where the roof bow 114 and headers 112, 116 are shown attached to the roof panel. The distance from the top of the roof panel 12 to the bottom of the headers 112, 116 (shown in FIG. 1) and roof bows 114 (shown in FIG. 1) is approximately 30 mm. Accordingly, in the present disclosure where the sandwich panel 10 incorporates the structure of the roof bows 114, the sandwich panel 10 may have a total thickness of approximately 30 mm. Furthermore, the sandwich panel 10 provides at least the requisite stiffness characteristics thereby rendering separate roof bows 114 (shown in FIG. 1) of a traditional roof structure 110 (shown in FIG. 1) unnecessary.

Referring now to FIGS. 7 and 8, a non-limiting example of the sandwich panel 10 of the present disclosure is shown wherein the sandwich panel 10 is a roof panel. As shown, the first panel 14 may be shaped so that it may optimized for loading conditions. For example, the first panel 14 may be stamped in specific areas where the roof bows 114 are traditionally located such that the first panel 14 may absorb energy in the event of a collision. Furthermore, referring now to FIG. 8, the ends of the first and second panels 12, 14 may have flanges 34 that can either be welded or bonded to the roof rails (not shown) similar to the traditional method of attaching a roof panel to the roof rails.

The sandwich panel 10 of the present disclosure minimizes the gauge or thickness for the panels 14, 12 sheet metal given the benefits of the sandwich construction using the foam 24. Significant weight reductions can be achieved by reducing the gauge in the panels 14, 12 and sheet metal panels.

As is known in the art, oil canning generally presents an issue with sheet metal panels. Oil canning is generally known as a moderate deformation or buckling of sheet material, particularly common with flat sheet metal surfaces. Oil canning may be caused by uneven stresses at the fastening points. Oil canning may also be the popping sound made when pressure is applied to the deformed sheet forcing the deformation in the opposite direction. The sandwich panel 10 of the present disclosure limits oil canning in the sheet metal given the additional stiffness that the foam 24 provides under the second panel 12. The second panel 12 may be made of metal material or a polymeric material.

Referring now to FIG. 9, a flow chart of a method of the present disclosure is shown. The method includes the steps of providing 36 a first panel 14 wherein the first panel 14 defines a plurality of apertures 18. The second step is providing 38 a second panel 12. In one non-limiting example, the first panel 14 and the second panel 12 may each formed from a metal panel. The third step of the method of the present disclosure is coupling 40 the first panel to the second sheet metal panel. The first panel 14 and the second panel 12 may be mechanically interlocked to one another in one non-limiting example. In yet another non-limiting example, the first panel 14 and the second panel 12 may be welded together. A cavity 46 is defined 42 between the first panel and the second panel when the first panel is joined with the second panel. The fourth step includes filling 44 the cavity with a foam. The cavity 46 may be filled with foam by inserting a foam dispensing tool into at least one of the plurality of apertures defined in the first panel.

In one non-limiting example, the foam 24 may be an expandable polyurethane foam 24 material having a low density, such as but not limited to DOW's Betaform Polyurethane foam 24. It is also to be understood that the first panel 14 and the second panel 12 may be formed from steel sheet panels. The first panel 14 and the second panel 12 may have a thickness of 1 mm. However, it is to be understood that the thickness of the first panel 14 and the second panel 12 may be different from one another and the thicknesses may be greater or less than 1 mm.

Additional optional steps include trimming the foam 24 (after it has expanded out of the holes) to provide a flush surface for the first panel 14. The trimming of the foam 24 may be performed by either a manual or an automatic machined operation. With respect to the example embodiment of a roof structure, the resulting sandwich structure provides a greater strength to weight ratio than the traditional structure of a 2 mm thick steel sheet with roof bows.

The above embodiment(s) are merely exemplary, and are not to be interpreted as limiting the scope of the present disclosure. The scope of the present disclosure should be defined by the following claims. It will be apparent to those skilled in the art that the disclosed embodiments may be modified. Therefore, the foregoing description is to be considered exemplary rather than limiting.

What is claimed is:

1. A sandwich panel for a vehicle comprising:
   a first panel defining a plurality of apertures;
   a second panel attached to the first panel, the second panel and the first panel defining a cavity between the first panel and the second panel;
   foam disposed between the first panel and the second panel, the plurality of apertures of the first panel are operatively configured to receive a tool for pumping expandable foam in between the first panel and the second panel.

2. The sandwich panel as defined in claim 1 wherein the first panel and the second panel are made of a structural material.

3. The sandwich panel as defined in claim 1 wherein the first panel and the second panel are each stamped.

4. The sandwich panel as defined in claim 1 wherein the first panel and the second panel are each molded.

5. The sandwich panel as defined in claim 1 the first panel and the second panel form a flange where the first panel joins the second panel.

6. The sandwich panel as defined in claim 5 wherein the flange is welded or bonded to a vehicle body structure.

7. The sandwich panel as defined in claim 4 where the first panel, the second panel and the foam are operatively configured to provide substantially the same structural support as a single sheet metal panel coupled with a roof bow.

8. The sandwich panel as defined in claim 1 wherein the first panel and the second panel are each approximately 1 mm. thick.

9. The sandwich panel as defined in claim 1 wherein the foam is pumped in between the first panel and the second panel through the plurality of apertures.

10. The sandwich panel as defined in claim 9 wherein the foam expands upon insertion between the first panel and the second panel.

11. A method for manufacturing a sandwich panel comprising the steps of:
   providing a first panel, the first panel defining a plurality of apertures;
   providing a second panel;
   coupling the first panel to the second panel;
   defining a cavity between the first panel and the second panel; and
   filling the cavity with an expandable foam material through the plurality of apertures.

12. The method for manufacturing a sandwich panel, as defined in claim 11 wherein the first panel and the second panel are stamped panels.

13. The method for manufacturing a sandwich panel as defined in claim 12 wherein the foam is operatively configured to expand upon injection between the first panel and the second panel.

14. The method for manufacturing a sandwich panel as defined in claim 13 wherein the first panel, the second panel, and the foam material are operatively configured to resist oil-canning and dentability.

15. The method for manufacturing a sandwich panel as defined in claim 13 wherein the first panel and the second panel form a flange, the flange being operatively configured to be affixed to a roof rail.

16. The method for manufacturing a sandwich panel as defined in claim 15 wherein the flange is welded to the roof rail.

17. The method for manufacturing a sandwich panel as defined in claim 15 wherein the flange is bonded to the roof rail.

18. The method for manufacturing a sandwich panel as defined in claim 11 wherein the first panel and the second panel are molded structural panels.

\* \* \* \* \*